(12) United States Patent
Wang et al.

(10) Patent No.: US 8,437,777 B2
(45) Date of Patent: *May 7, 2013

(54) METHOD AND SYSTEM FOR MANAGING IMAGES AND GEOGRAPHIC LOCATION DATA IN A MOBILE DEVICE

(75) Inventors: John C. Wang, Taoyuan (TW);
Shu-Fang Hsu, Taoyuan (TW);
Chih-Wei Cheng, Taoyuan (TW)

(73) Assignee: HTC Corporation, Tauyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/560,854

(22) Filed: Jul. 27, 2012

(65) Prior Publication Data

US 2012/0302255 A1 Nov. 29, 2012

Related U.S. Application Data (63) Continuation of application No. 12/358,192, filed on Jan. 22, 2009, now Pat. No. 8,311,556.

(51) Int. Cl.
*H04W 24/00* (2009.01)
(52) U.S. Cl.
USPC ........................................ 455/456.1; 701/207
(58) Field of Classification Search ............... 455/456.1; 701/208
See application file for complete search history.

(56) References Cited

U.S. PATENT DOCUMENTS

| | | | |
|---|---|---|---|
| 6,507,363 B1 | 1/2003 | Anderson et al. | |
| 6,697,731 B2 * | 2/2004 | Takayama et al. | 701/516 |
| 7,359,797 B2 * | 4/2008 | Dorfman et al. | 701/408 |
| 2002/0164995 A1 | 11/2002 | Brown et al. | |
| 2003/0063133 A1 * | 4/2003 | Foote et al. | 345/850 |
| 2005/0041015 A1 * | 2/2005 | Kohda et al. | 345/156 |
| 2005/0216186 A1 * | 9/2005 | Dorfman et al. | 701/207 |
| 2006/0114514 A1 * | 6/2006 | Rothschild | 358/3.28 |

(Continued)

FOREIGN PATENT DOCUMENTS

| | | |
|---|---|---|
| EP | 1796099 A1 | 6/2007 |
| GB | 2406747 A | 4/2005 |

(Continued)

OTHER PUBLICATIONS

Extended European Search Report for EP Application No. 09162786. 9; HTC Corporation; Jul. 22, 2009, 10 pages.

(Continued)

*Primary Examiner* — George Eng
*Assistant Examiner* — Joseph Dean, Jr.
(74) *Attorney, Agent, or Firm* — Perkins Coie LLP (57) ABSTRACT

A method and system for managing images and associated geographic location data in a mobile device generates images using an integrated camera. After generating an image, the system determines a geographic location associated with the image. The system then stores the image, the associated geographic location data, and a record of the association in the mobile device's storage component. The system associates supplemental information, such as telephone number, category, and street address, with the image. The system provides one or more display modes for displaying the image and the associated information, including a list mode for displaying multiple images and portions of the associated data and a detail mode for displaying a selected image and the full set of associated data. The system may also provide a map display mode for displaying locations associated with one or more images on a map of a geographical area.

20 Claims, 11 Drawing Sheets

U.S. PATENT DOCUMENTS

| | | |
|---|---|---|
| 2007/0049267 A1 | 3/2007 | Kota et al. |
| 2007/0123270 A1* | 5/2007 | Casey .................. 455/456.1 |
| 2007/0233368 A1 | 10/2007 | Friedmann |
| 2007/0233740 A1 | 10/2007 | Nichols et al. |
| 2008/0146274 A1 | 6/2008 | Cho |
| 2008/0254811 A1* | 10/2008 | Stewart .................. 455/456.2 |

FOREIGN PATENT DOCUMENTS

| | | |
|---|---|---|
| JP | 2003319029 A | 11/2003 |
| JP | 2004178485 A | 6/2004 |
| JP | 2005100353 A | 4/2005 |
| JP | 2005223436 A | 8/2005 |
| JP | 2005260393 A | 9/2005 |
| JP | 2008283344 A | 11/2008 |

OTHER PUBLICATIONS

Extended European Search Report for EP Application No. 09162786.9; HTC Corporation; Nov. 4, 2009, 12 pages.

* cited by examiner

METHOD AND SYSTEM FOR MANAGING IMAGES AND GEOGRAPHIC LOCATION DATA IN A MOBILE DEVICE

BACKGROUND

As mobile technology improves, mobile devices have become smaller and more powerful. The wireless networks they connect to have improved, as well. These improvements mean that mobile devices can now connect to networks for many functions beyond simple voice calling. For example, they can be used to send e-mail, browse the Internet, and send instant messages. Many devices also include a Global Positioning System (GPS) receiver with integrated mapping (or maps downloaded from a network). In some cases, the mobile devices support wireless standards providing local connectivity, such as Bluetooth or IEEE 802.11. These standards can enable the devices to connect to a WLAN or even communicate with other mobile devices in a peer-to-peer mode. Many mobile devices also include an integrated camera that allows a user to take pictures or record video. As technology improves, it would be useful to have applications that are better able to make use of these increased capabilities.

DETAILED DESCRIPTION

A system for managing images and associated geographic location data in a mobile device is disclosed (hereinafter referred to as the "image location system" or the "system"). The mobile device uses an integrated camera to generate one or more images. After generating an image, the system determines a geographic location associated with the image. The system may do so using a built-in GPS receiver or using other methods, such as triangulation based on the mobile device's proximity to one or more mobile network base stations. The system then stores the image, the associated geographic location data, and a record of the association in the mobile device's storage component. The system may also associate supplemental information, such as telephone number, category, and street address, with the image.

The system provides one or more display modes for displaying the image and the associated information. The display modes may include a list mode for displaying multiple images and portions of their associated data and, a detail mode for displaying a selected image and the full set of associated data. The system may also provide a map display mode for displaying locations associated with one or more images on a map of a geographical area. The system may also provide a search function to enables a user to find images based on the geographic location or the supplemental information.

Various embodiments of the application will now be described. The following description provides specific details for a thorough understanding and an enabling description of these embodiments. One skilled in the art will understand, however, that the application may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the application.

Figure 1:
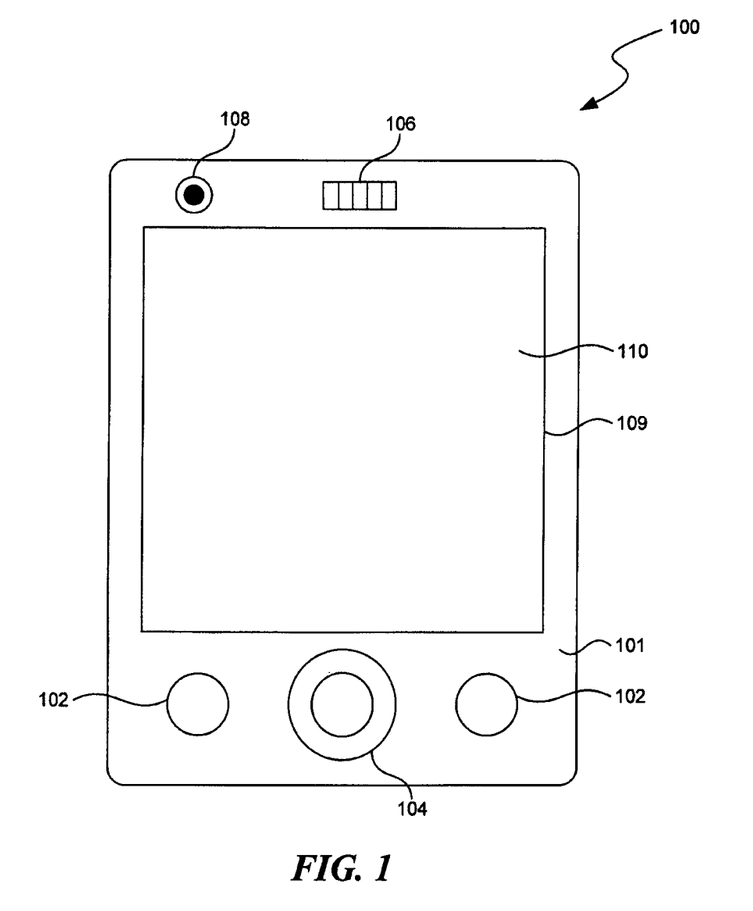
FIG. 1 is a front view of a mobile device suitable for implementing an image location system.

FIG. 1 is a front view of a mobile device 100 suitable for implementing an image location system. As shown in FIG. 1, the mobile device 100 may include a housing 101, a plurality of push buttons 102, a directional keypad 104 (e.g., a five-way key), a microphone 105, a speaker 106, a camera 108, and a display 110 carried by the housing 101. The mobile device 100 may also include microphones, transceivers, photo sensors, and/or other computing components generally found in PDA devices, cellular phones, laptop computers, tablet PCs, smart phones, hand-held email devices, or other mobile communication/computing devices.

The display 110 may include a liquid-crystal display (LCD), a plasma display, a vacuum fluorescent display, a light-emitting diode (LED) display, a field emission display, and/or other suitable types of display configured to present a user interface. The mobile device 100 may also include a touch sensing component 109 configured to receive input from a user. For example, the touch sensing component 109 may include a resistive, capacitive, infrared, surface acoustic wave (SAW), and/or other types of touch screen. The touch sensing component 109 may be integrated with the display 110 or may be independent from the display 110. In the illustrated embodiment, the touch sensing component 109 and the display 110 have generally similarly sized access areas. In other embodiments, the touch sensing component 109 and the display 110 may have differently sized access areas. For example, the touch sensing component 109 may have an access area that extends beyond a boundary of the display 110.

The mobile device 100 may also include a camera 108 suitable for taking pictures or recording video. The camera 108 includes an optical image sensor and a lens, and may also have a flash associated with it for taking pictures in low-light conditions. Although the camera component 108 is shown on the front face of the mobile device 100, the camera component 108 could also be located on the rear face of the device. Alternatively, the mobile device 100 might be configured with multiple cameras, such as with a first camera on the front face and a second camera on the back face.

Figure 2:
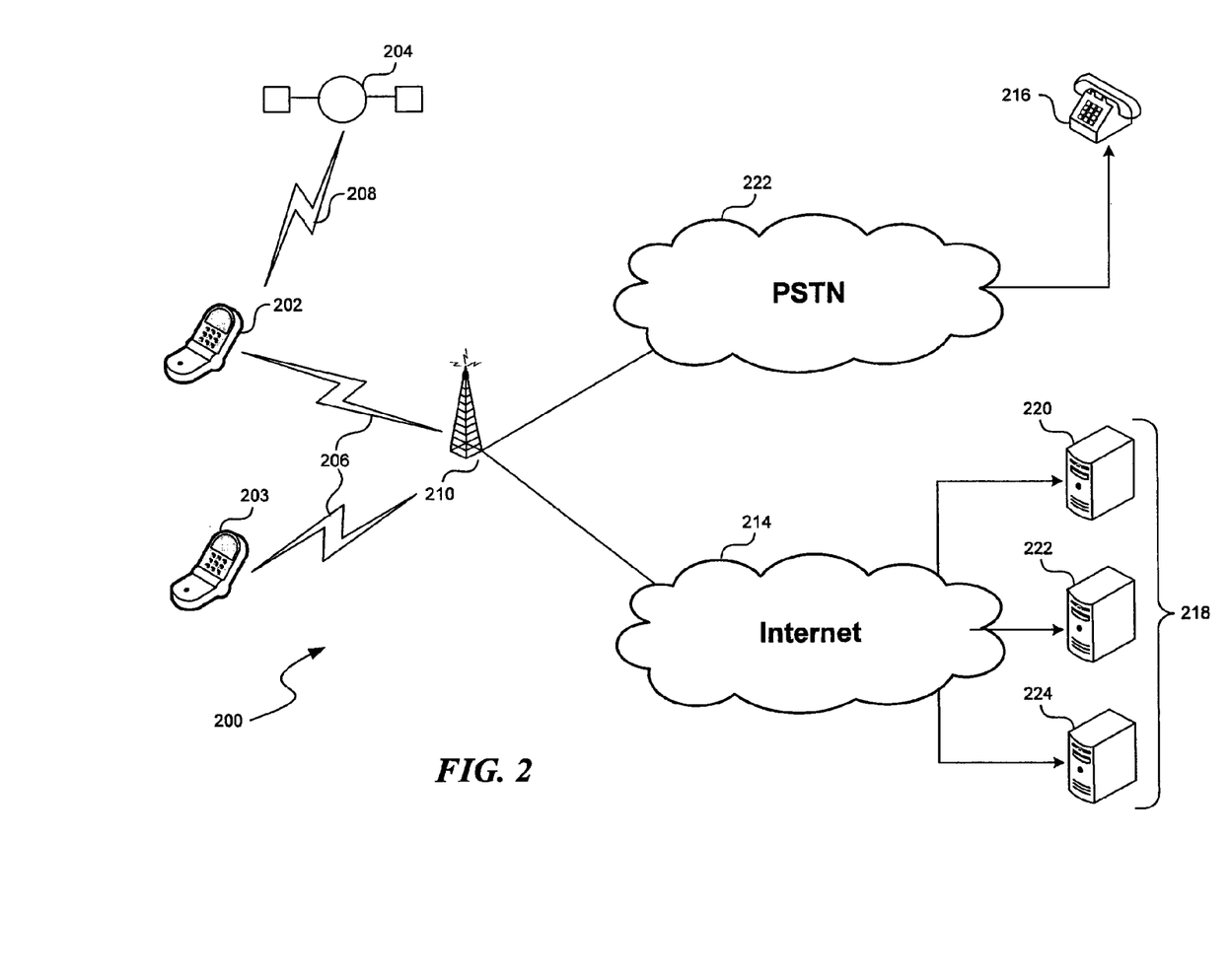
FIG. 2 is a network diagram of a representative environment in which the image location system operates.

FIG. 2 is a network diagram of a representative environment 200 in which the image location system operates. A plurality of mobile devices 202 and 203 roam in an area covered by a wireless network. The mobile devices are, for example, cellular phones or mobile Internet devices, such as the mobile device 100 shown in FIG. 1. The mobile devices 202 and 203 communicate to a cellular transceiver 210 through a wireless connection 206. The wireless connection 206 could be implemented using any system for transmitting digital data. For example, the connection could use a cellular network implementing GSM, UMTS, or CDMA2000 or a non-cellular network implementing WiFi (IEEE 802.11) or Bluetooth. Although wireless connections are most common for these mobile devices, the devices may also communicate using a wired connection such as Ethernet.

In some configurations, the mobile device 202 also has a Global Positioning System (GPS) receiver embedded in it to provide location information. In these configurations, the mobile device 202 also receives a location signal 208 from one or more GPS satellites 204. For clarity, the figure only shows one satellite. However, a GPS receiver generally requires several satellites in order to determine its location. Alternatively or additionally, the cellular transceiver 210 may, with assistance from the mobile device 202, employ known signal triangulation and/or signal delay techniques to determine a location of each wireless device.

The cellular transceiver 210 is connected to one or more networks that provide backhaul service for the wireless network. The cellular transceiver 210 is connected to the Public-Switched Telephone Network (PSTN) 212, which provides a connection between the mobile network and a remote telephone 216 on another network. When the user of the mobile device 202 makes a voice telephone call, the cellular transceiver 210 routes the call through the wireless network's voice backhaul (not shown) to the PSTN 212. The PSTN 212 then automatically connects the call to the remote telephone 216. If the remote telephone 216 is another mobile device, the call is routed through a second wireless network backhaul to another cellular transceiver.

The cellular transceiver 210 is also connected to the Internet 214, which provides a packet-based connection to remote devices 218 supporting network applications. When the user of the mobile device 202 communicates through a data connection, the cellular transceiver routes the packet data through the wireless network's data backhaul (not shown) to the Internet 214 (or another packet-based network). The Internet connects the wireless network to remote devices 218, including an e-mail server 220, a web server 222, and an instant messenger server 224. Of course, the remote devices 218 may include any application available over the Internet, such as a file transfer protocol (FTP) server or a streaming media server.

Figure 3:
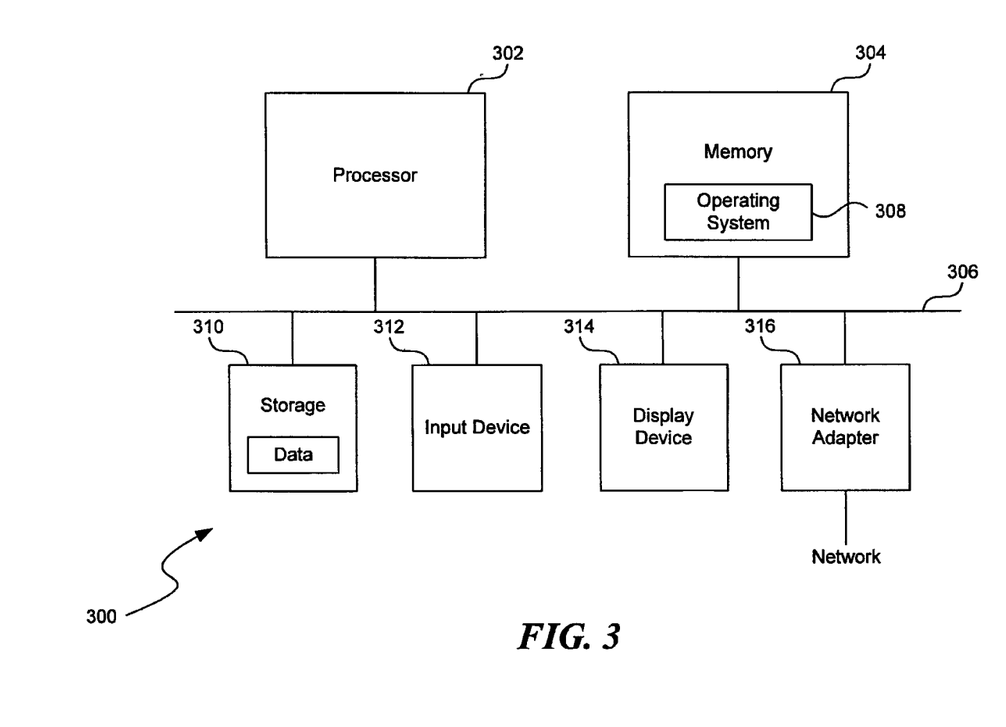
FIG. 3 is a high-level block diagram showing an example of the architecture of a mobile device.

FIG. 3 is a high-level block diagram showing an example of the architecture of a mobile device 300. The mobile device 300 may represent the mobile device 202 of FIG. 2.

The mobile device 300 includes one or more processors 302 and memory 304 coupled to an interconnect 306. The interconnect 306 shown in FIG. 3 is an abstraction that represents any one or more separate physical buses, point-to-point connections, or both connected by appropriate bridges, adapters, or controllers. The interconnect 306, therefore, may include, for example, a system bus, a Peripheral Component Interconnect (PCI) family bus, a HyperTransport or Industry Standard Architecture (ISA) bus, a Small Computer System Interface (SCSI) bus, a Universal Serial Bus (USB), IIC (I2C) bus, or an Institute of Electrical and Electronics Engineers (IEEE) standard 1394 bus, sometimes referred to as "Firewire".

The processor(s) 302 may include central processing units (CPUs) of the mobile device 300 and, thus, control the overall operation of the mobile device 300. In certain embodiments, the processor(s) 302 accomplish this by executing software or firmware stored in memory 304. The processor(s) 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 304 is or includes the main memory of the mobile device 300. The memory 304 represents any form of fixed or removable random access memory (RAM), read-only memory (ROM), flash memory, or the like, or a combination of such devices. In use, the memory 304 stores, among other things, the operating system 308 of the mobile device 300.

The mobile device 300 includes an input device 312, which enables a user to control the device. The input device 312 may include a keyboard, trackpad, touch-sensitive screen, or other standard computer input device. The mobile device 300 also includes a display device 314 suitable for displaying a user interface, such as the display 110 (FIG. 1). The network adapter 314 provides the mobile device 300 with the ability to communicate with remote devices over a network and may be, for example, a wireless adapter. The mobile device 300 may further include local storage 310 coupled to the interconnect 306. The local storage 310 may include, for example, a flash memory device configured to provide mass storage.

Figure 4A:
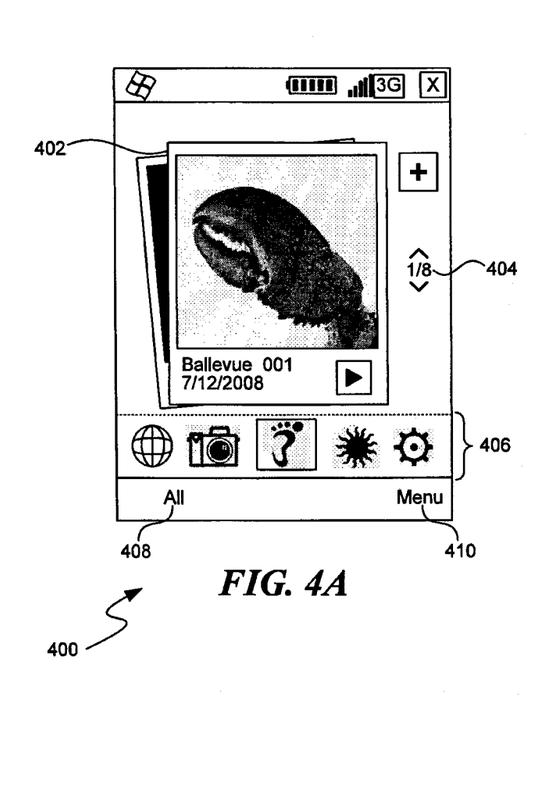
FIG. 4A shows an example interface in which a default startup screen is displayed.

FIGS. 4A through 4F illustrate screens of an example interface suitable for use by the image location system. FIG. 4A shows an example interface 400 in which a default startup screen is displayed. The default startup interface 400 shows a first image 402 that has been stored by the application. The interface 400 also includes a navigation component 404, which enables a user to navigate among the images that have been stored by the application. The interface 400 also includes multiple control buttons in a control bar 406 located below the first image 402. The buttons in the bar 406 may be selected using a touch-sensitive screen or other input device. The interface 400 also includes soft keys 408 and 410, which are used to control specific aspects of the application. The soft keys 408 and 410 may be controlled using the touch-sensitive screen or dedicated hardware buttons. The contents of the menu displayed in response to a user selecting the menu button 410 may be context sensitive and thus may vary depending on the current configuration of the interface.

Figure 4B:
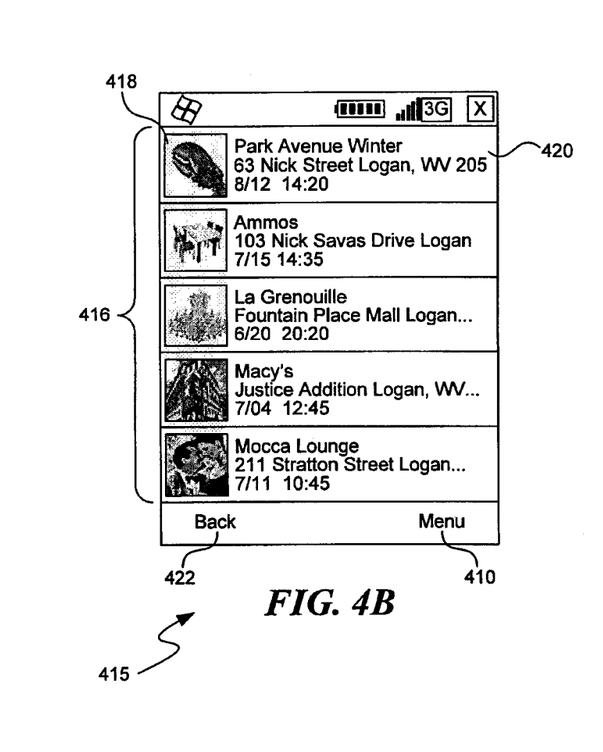
FIG. 4B shows an example interface for displaying multiple images in a list mode.

FIG. 4B shows an example interface 415 for displaying multiple images in a list mode. The interface 415 may be displayed, for example, in response to a user selecting the button 408 displayed in FIG. 4A. The item list 416 displays multiple thumbnail images 418 stored by the system and portions of the associated supplemental information 420. For example, the interface 415 displays the description information, street address, date, and time associated with each image. The interface 415 may also include a scrollbar or other navigation component (not shown) if not all images can be displayed in a single screen. The interface 415 also includes soft keys 422 and 410.

Figure 4C:
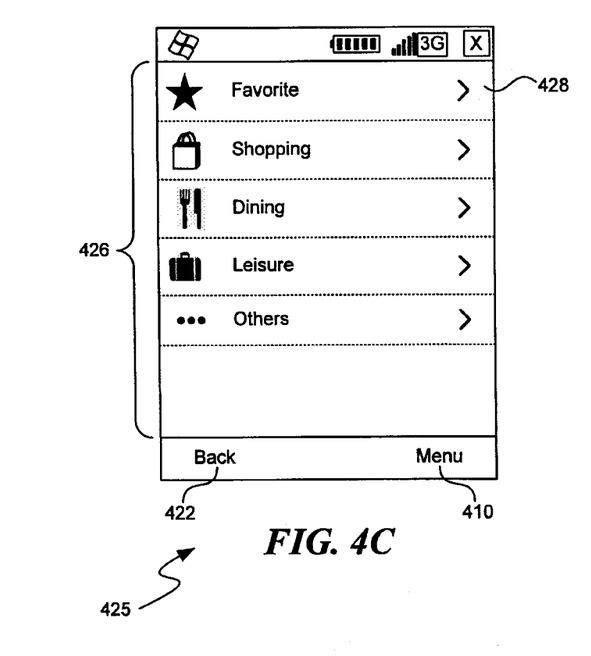
FIG. 4C shows an example interface for displaying a category view of the images stored by the system.

FIG. 4C shows an example interface 425 for displaying a category view of the images stored by the system. The interface 430 includes a category list 426, which displays a list of categories 428 that can be used to sort the images stored by the system. The interface 425 may be configured with a standard set of categories, such as the categories shown in FIG. 4C. Alternatively, the interface 425 may allow a user to add new categories to the list.

Figure 4D:
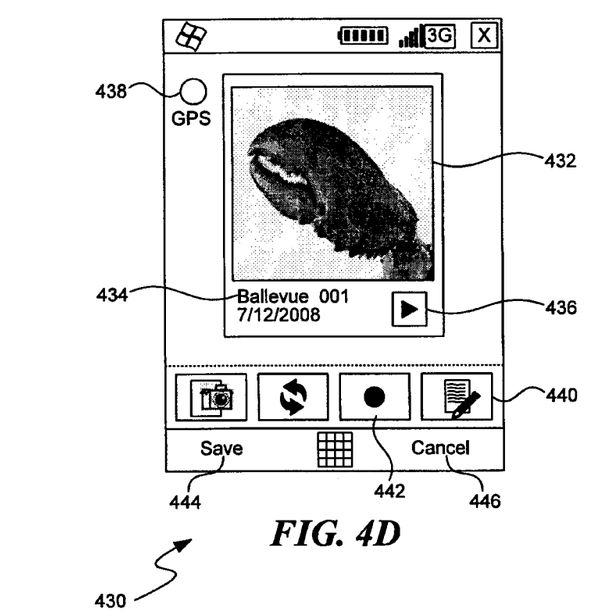
FIG. 4D shows an example interface for displaying a first detail view of an image.

FIG. 4D shows an example interface 430 for displaying a first detail view of an image. The interface 430 may be automatically displayed in response to a new image being received from the camera 108 or the network or in response to a user selecting an image for display. The interface 430 displays the image 432 and portions of the associated supplemental information 434, including the description information and the date on which the image was received. The interface 430 also includes a GPS indicator 438 to indicate whether a GPS location was provided for the image 432. The interface 430 may also include an edit button 440, which is selected to enter an editing mode to edit the supplemental information, and a record button 442, which is selected to record new audio data to associate with the image 432. The supplemental information 434 may also include a playback button 436, which may be selected by the user to play the contents of audio data associated with the image. The interface 430 has soft keys 444 and 446, which enable the user to save or cancel (respectively) changes.

Figure 4E:
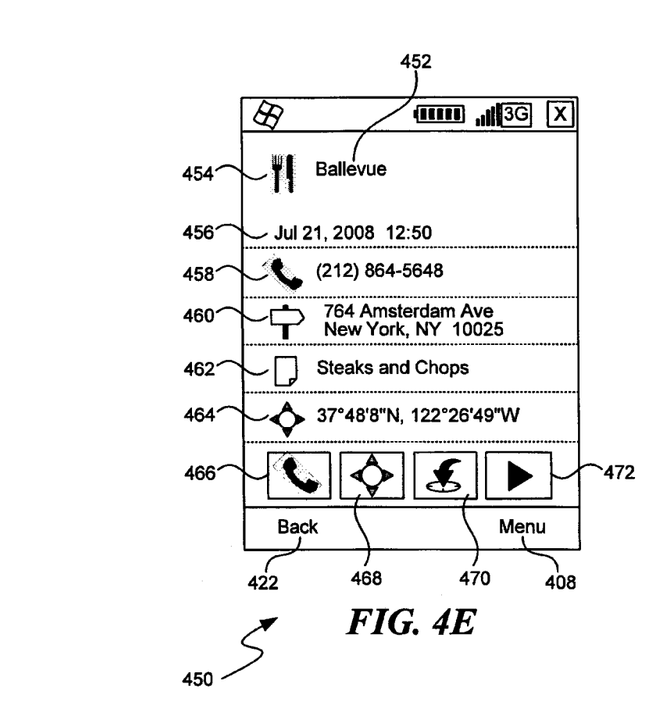
FIG. 4E shows an example interface for displaying a second detail view of a selected image.

FIG. 4E shows an example interface 450 for displaying a second detail view of an image selected from the initial interface 400 shown in FIG. 4A or the item list 416 shown in FIG. 4B. The interface 450 displays various types of supplemental information, including description information 452, category 454 (shown as an icon), date and time 456, telephone number 458, street address 460, notes 462, and geographic location 464. The interface 450 also includes function buttons 466-472, which execute functions based on the supplemental information 452-464. For example, selecting the telephone function button 466 causes the system to initiate a telephone call using the stored telephone number 458. Similarly, selecting the mapping button 468 causes the system to launch a mapping mode based on the geographic location 464 (discussed below). Selecting the navigation button 470 launches a navigation program to provide directions to the geographic location 464. Selecting the playback button 472 plays the contents of audio data associated with the image.

Figure 4F:
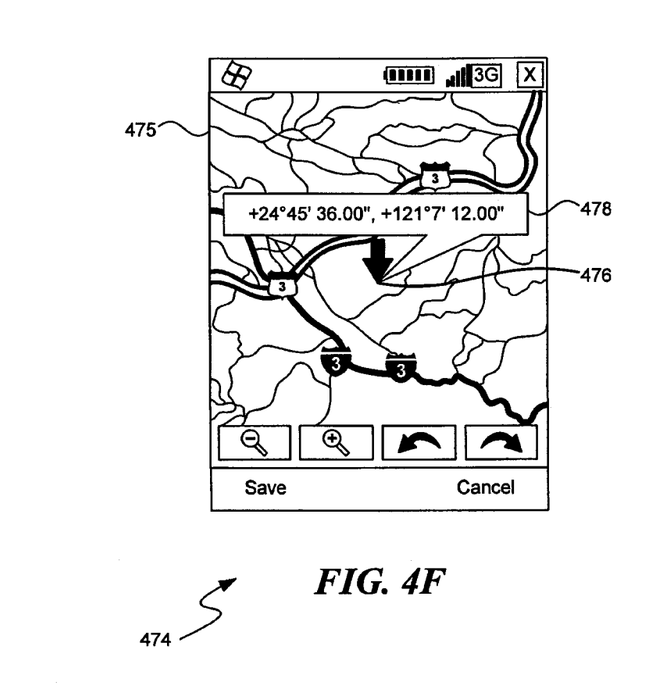
FIG. 4F shows an example interface for displaying a mapping mode associated with a selected image.

FIG. 4F shows an example interface 474 for displaying a mapping mode associated with a selected image. The interface 474 may be displayed, for example, in response to a user selecting mapping button 468 from the interface 450 in FIG. 4E. The interface 474 displays a map 475 of a geographical area, which may be provided by a standard mapping or GIS service, including databases stored locally or accessed using a network connection (e.g. Google Maps or Microsoft Live Maps). The interface 474 provides a geographic indicator 476, which is placed at a location on the map corresponding to the geographic location 464 associated with a selected image. The interface 476 also includes an information bubble 478, which displays supplemental information, such as the geographic location, the street address, or the telephone number. The mapping mode may also display locations associated with multiple images stored by the system using multiple geographic indicators 476 and information bubbles 478.

Figure 4G:
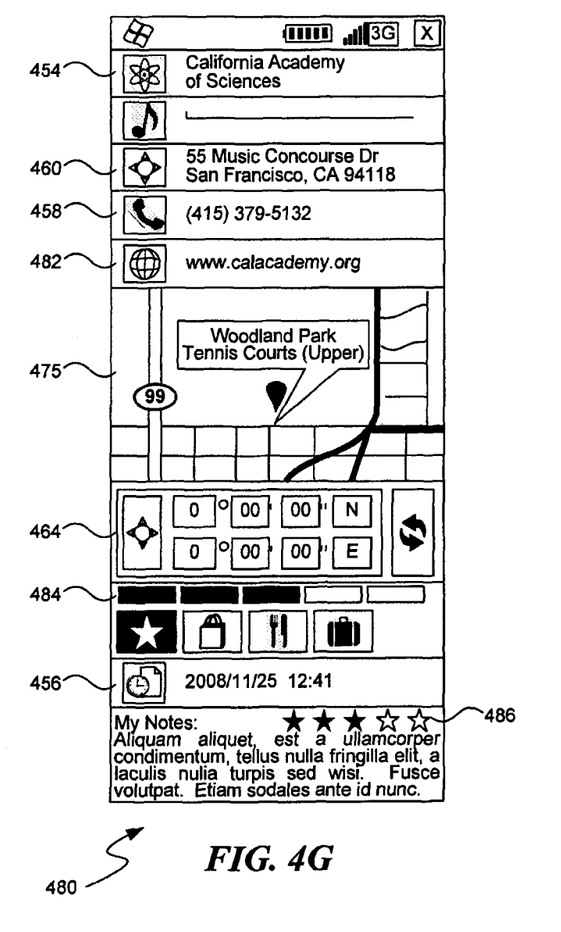
FIG. 4G shows an alternate interface for displaying a detail view of a selected image.

FIG. 4G shows an alternate interface 480 for displaying a detail view of a selected image. The alternate interface 480 presents much of the same information as in the previous example interfaces shown in FIGS. 4E and 4F, including description information 454, street address 460, telephone number 458, geographical location 464, and date and time 456. The interface 480 also displays additional information, including network location 482, which can be used to show a URL or other address format suitable to direct a user to a web page or other network information resource. The interface 480 also displays an accuracy rating 484, which displays the system's estimate of the accuracy of the geographic location data. The interface 480 also includes a user opinion rating 486, which enables a user to provide a rating on the image's quality or importance. The interface 480 also includes a map area to display a map 475 of a geographic area similar to the map displayed in FIG. 4F. The map area includes a geographic indicator 476 and an information bubble 478.

Figure 5:
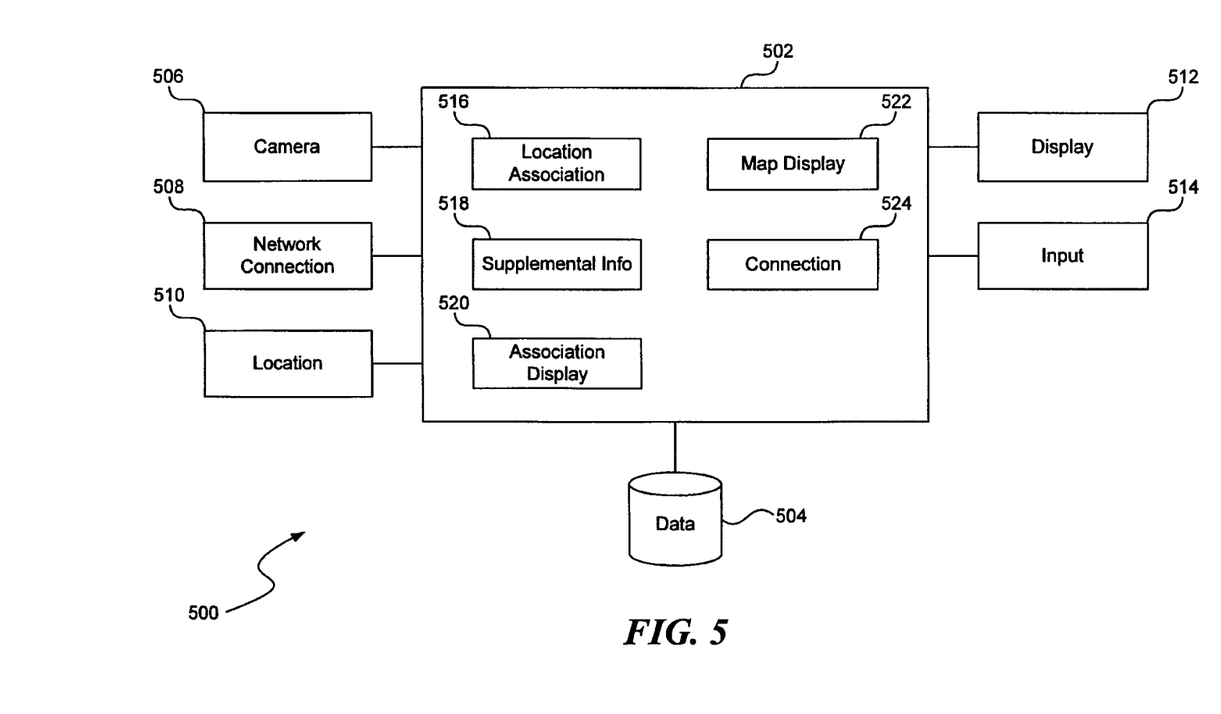
FIG. 5 is a logical block diagram of the image location system shown in FIG. 3.

FIG. 5 is a logical block diagram of the image location system 500. The system 500 may be executed, for example, using the memory and processor of FIG. 3. Although the various modules are depicted in a single device, the modules are not necessarily physically collocated. In some embodiments, the various modules may be distributed over multiple physical devices. Similarly, the data storage could be implemented using local storage components, such as a hard drive or flash memory, or using remote storage, such as a web server accessible through the internet. The code to support the functionality of this system may be stored on a computer readable medium such as an optical drive, flash memory, or a hard drive. Aspects of the system 500 may be implemented as software, firmware, hardware, or as a combination of these.

The system 500 includes processing component 502, which is configured to manage images and other information handled by the system. The processing component 502 is connected to a data storage component 504, which stores images, geographic location data, and supplemental information processed by the system. The data storage component 504 may also store configuration and settings information. The processing component 502 is connected to a camera component 506, which provides images to be managed by the system 500. The camera component 506 may be integrated with the mobile device, as shown in FIG. 1. However, the camera component 506 may also be a separate device configured to communicate with the mobile device using, e.g. a wireless Bluetooth connection. The processing component 502 is also connected to a network connection component 508, which provides a connection to a mobile wireless network. The processing component 502 is also connected to a location component 510, which is configured to generate data indicating the current geographic location of the mobile device. In some configurations, the location component 510 includes a GPS receiver, which is configured to use signals from one or more GPS satellites to determine a geographic location of the device. The location component 510 may also be configured to determine the geographic location based on the device's proximity to one or more cellular network transceivers or wireless hotspots or using other well-known methods. The location component 510 may also be configured to present the user with a graphical interface and determine the geographic location based on user input. For example, the location component 510 may provide a map and determine the geographic location based on the user selecting a location on the map.

The processing component 502 is also connected to an input component 514 that is configured to receive user input through an input device 312, such as a touch-sensitive screen. The processing component also connects to a display component 512, which is configured to control the screen of the mobile device as directed by the processing component 502.

The processing component 502 includes a location association component 516, which is configured to determine an association between a received image and a geographic location. During operation, the location association component 516 receives an image from the camera component 506 and geographic location data from the location component 510. The location association component 516 then stores the image, the geographic location data, and information indicating the association in the data storage component 504.

The processing component 502 also includes a supplemental information component 518, which is configured to receive and process supplemental information to be associated with an image received from the camera component 506. The supplemental information may be received from various components in the system, such as the input component 514 or the location component 510. For example, the user may use the input component 514 to provide description, telephone number, street address, or network address. The location component 510 may provide other supplemental information, such as an accuracy index indicating the estimated accuracy of the geographic location determined by the location component 510. Other supplemental information, such as the date and time associated with a received image, may be provided directly by the camera component 506.

The processing component 502 includes an association display component 520, which is configured to control the display component 512 to display stored image, geographic information data, and portions of the supplemental information. Thus, the association display component 520 may control the system 500 to display multiple images and associated data in a list mode or to display a single image and associated data in a detail mode.

The processing component 502 also includes a map display component 522, which controls the system 500 to display a mapping mode interface such as the interface shown in FIG. 4F. The map display component 522 uses image information, geographic location data, and supplemental information to configure the map display. In addition, the map display component 522 uses map information received from a map database stored locally on the device or provided through the network connection 508. The map display component 522 then controls the display component 512 to display the selected map and a portion of the data stored by the storage component 504 (e.g. description information, street address, etc.). The map display component 522 may also be configured to change the map display in response to move and zoom commands received through the input component 514. The association display component 520 and the map display component may operate separately to display interfaces such as the interfaces in FIGS. 4B and 4E or simultaneously to display a combined interface such as the interface shown in FIG. 4G. The map display component 522 may also be configured to display points of interest nearby the geographic location of the selected image. For example, the map display component 522 may display indicators of restaurants, hotels, or landmarks near the geographic location.

The processing component also includes a connection component 524, which is configured to connect the system 500 to outside devices. For example, the connection component 524 may be configured to initiate a telephone call from the mobile device using a telephone number present in the supplemental information. The connection component 524 may also transmit an image and its associated data (e.g geographic location data) using an HTML document, Multimedia Messaging Service (MMS), or e-mail.

Figure 6A:
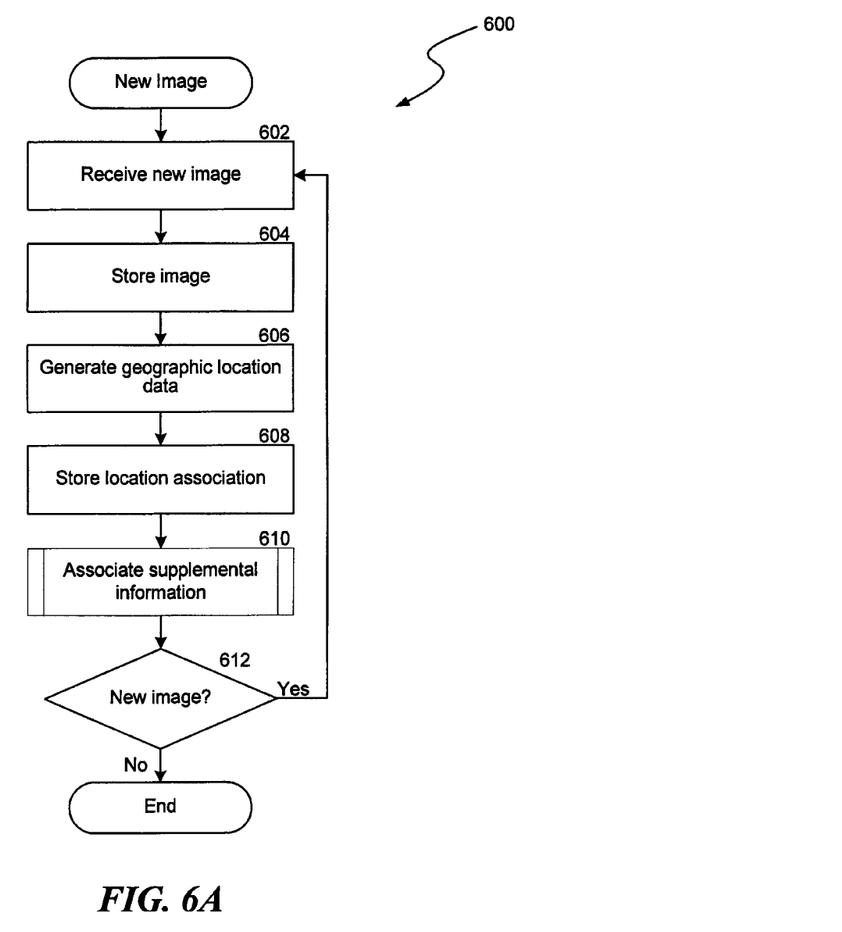
FIG. 6A is a flowchart of a process for storing a new image by the image location system.

FIG. 6A is a flowchart of a process 600 for storing a new image by the image location system. The process 600 may be initiated manually in response to a command from the user or automatically based on settings stored in the mobile device. For example, the mobile device may be configured to automatically launch the image location system when a new image is taken by the camera component 506.

The process begins at block 602, where the system receives a new image from the camera component 506 or from another source using the network connection 508. The system then proceeds to block 604, where it stores the image. After receiving and storing a new image, processing proceeds to block 606, where the system generates new geographic location data to associate with the new image. The new geographic location data may be generated using any of the methods discussed above, such as using an integrated location component or receiving information from a user defining a location. After the geographic location data has been generated, processing proceeds to block 608, where the system stores an association between the new image and the geographic location data. After storing the location association, the system proceeds to block 610, where it associates supplemental information with the new image. The process of associating supplemental information is discussed in greater detail below with reference to FIG. 6B.

After associating supplemental information, the system proceeds to decision block 612, where it determines whether a new image is available for processing. If a new image is available for processing, processing returns to block 602, where the system processes the new image. If a new image is not available, the process ends. The decision in block 612 may be automatic or based on a user response to a query presented by the system.

Figure 6B:
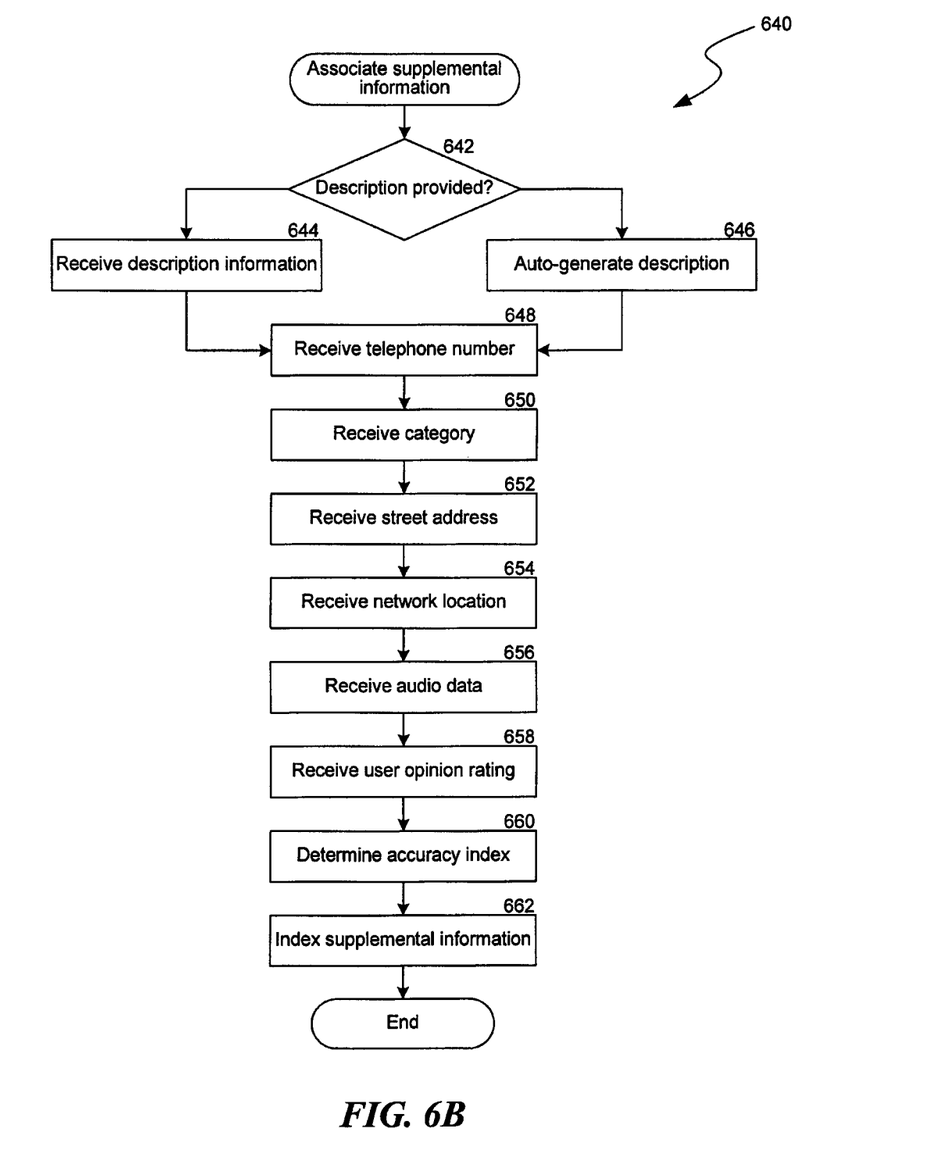
FIG. 6B is a flowchart of a process for associating supplemental information with a received image.

FIG. 6B is a flowchart of a process 640 for associating supplemental information with a received image. It will be appreciated that a user may elect to associate all or some of the supplemental information with the selected image. Thus, the system may implement part or all of the process 640.

The process begins at decision block 642, where the system determines whether description information has been provided. This step is used to ensure that an appropriate identifier is assigned to the image being processed by automatically assigning description information if the user does not provide it. If the system determines that description information has been provided, the system proceeds to block 644, where it receives the provided description information. If description information was not provided, the system proceeds to block 646, where it automatically generates the description information. The system may automatically determine the description by using other provided information, such as the current geographic location of the mobile device (e.g. the name of the city associated with the current geographic location) or country information stored on the mobile device. The country information may be determined, for example, based on a mobile country code stored on a Subscriber Information Module (SIM) or other memory component present in the mobile device.

After determining the description information, the system proceeds to block 648, where it receives a telephone number from the user. The system then proceeds to block 650, where it receives category information from the user. As discussed above, the categories may be chosen from a predetermined list of categories or may be configurable by the user.

After receiving category information, the system proceeds to block 652, where it receives a street address. The street address may be provided by the user or may be automatically determined based on the geographic location using mapping software or a mapping server providing Reverse Geocoding service (e.g. Google Maps service provided by Google, Inc. of Mountain View, Calif.). The system then proceeds to block 654, where it receives network location data, such as a URL. The network location may be, for example, a web page associated with a business located at the geographic location. Thus, if the image is taken at a particular restaurant, the network location could be the website of the restaurant.

The system then proceeds to block 656, where it receives audio data to associate with the image. The audio data may be received, for example, from a user speaking into the microphone of the mobile phone. After receiving audio data, the system proceeds to block 658, where it receives a user opinion rating. The user opinion rating may be provided as, for example, a star rating from one to five stars. The system then proceeds to block 660, where it determines an accuracy index to associate with the image. As noted above, the accuracy index is generally generated automatically by the location component 510 and may be determined based on the method used to determine the location. Thus, the system may provide a higher accuracy index if the location was provided by a GPS receiver than if the location was determined based on proximity to cellular network transceivers. The system may also provide a higher accuracy if the location signal received from the GPS satellites is strong and a lower accuracy if the location signal is weak.

The system then proceeds to block 662, where it indexes and stores the supplemental information. The indexing step may be used, for example, to support search functionality provided by the system. For example, the system in step 662 may generate a list of key words associated with the image and the supplemental information.

Figure 7:
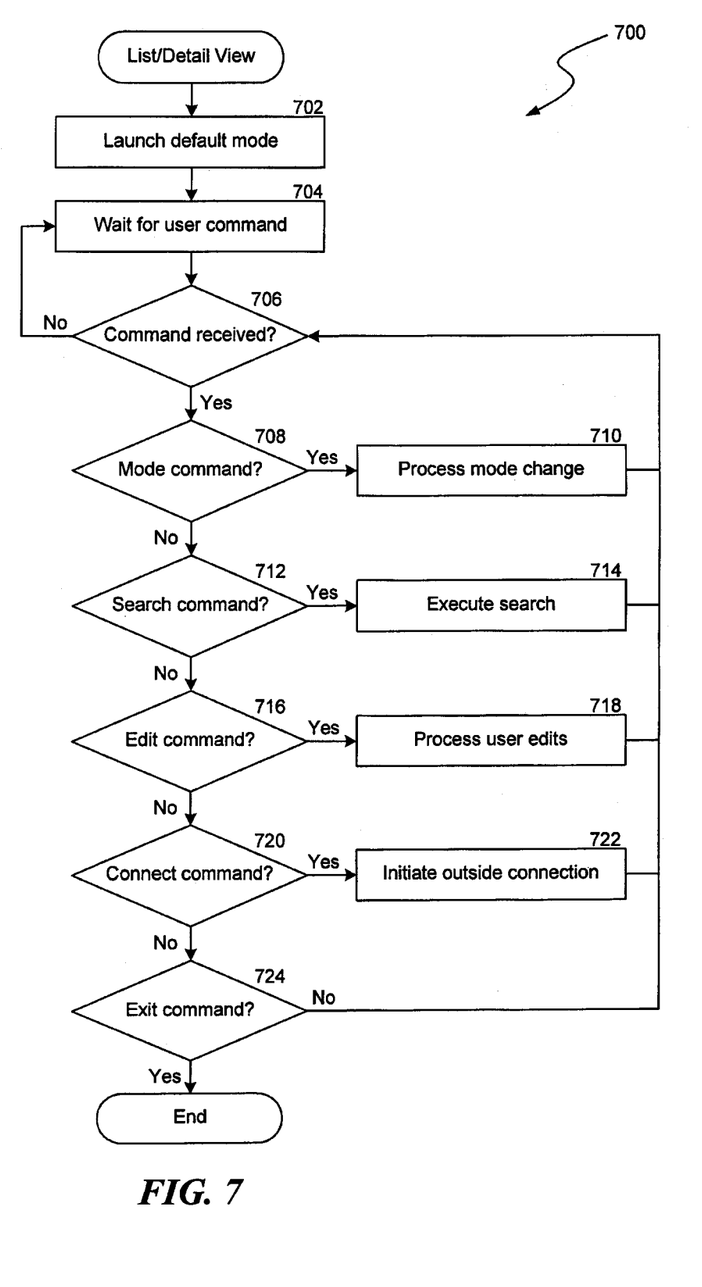
FIG. 7 is a flowchart of a process for processing commands in a list mode or detail mode of the image location system.

FIG. 7 is a flowchart of a process 700 for processing commands in a list mode or detail mode of the image location system. Processing begins in block 702, where the system launches in a default mode. The default mode may be, for example, the initial selection interface 400 as shown in FIG. 4A. Alternatively, the system may be configured to resume operation in the same state as a previous use (e.g. displaying an image viewed in a previous session), so that the user can seamlessly resume using the system. The system may also be configured to launch in the list mode or to launch by displaying the category listing.

After launching in the default mode, processing proceeds to block 704, where the system waits to receive a user command. Processing then proceeds to decision block 706, where the system determines if a command has been received. If a command is not received, the system returns to block 704 to continue waiting to receive a command.

If a command was received, the system proceeds to decision block 708, where it determines if a mode change command was received. If a mode change command was received, the system proceeds to block 710, where it processes the mode change command. A mode change command may include, for example, a command directing the system to change from a list mode to a detail mode or vice versa, to change from a default mode to a detail mode or vice versa, or to change from a default mode to a list mode or vice versa. The command may also direct the system to change from the list or detail modes to the mapping mode. The executing step may include accessing the data storage component 504 to gather necessary data or using the network connection component 508 to connect to a remote database. For example, the system may use the network connection component 508 to connect to a map provider in order to change to the mapping mode.

If the received command is not a mode command, the system proceeds to decision block 712, where it determines if the received command was a search command. If the received command was a search command, the system proceeds to block 714, where it executes the search. Executing a search may include, for example, receiving input search terms or an input text string. The system may then use a stored index of terms to find images having information (e.g. geographic location data or supplemental information) matching the input search terms.

If the received command was not a search command, processing proceeds to decision block 716, where the system determines if an edit command was received. If an edit command was received, the system proceeds to block 718, where it processes any user edits. The processing in block 718 may include, for example, displaying an edit interface to enable the user to provide new values for the supplemental information. The system may also be configured to automatically provide some data in response to an edit command. For example, the system may automatically provide new geographic location data in response to a command to edit the geographic location.

If the received command was not an edit command, the system proceeds to decision block 720, where it determines if a connect command was received. If a connect command was received, the system proceeds to block 722, where it initiates an outside connection by, for example, initiating a telephone call from the mobile device or sending a selected image using an HTML document, MMS, or e-mail.

If the received command was not an connect command, the system proceeds to decision block 724, where it determines if an exit command was received. If an exit command was not received, the system returns to block 704 to wait for the next user command. If an exit command was received, the process ends. Of course, it will be appreciated that the process 700 may be modified to handle additional commands provided by the system in a similar way.

From the foregoing, it will be appreciated that specific embodiments of the application have been described herein for purposes of illustration, but that various modifications may be made without deviating from the spirit and scope of the application. Accordingly, the application is not limited except as by the appended claims.

We claim:

1. A mobile communication device for managing images and associated geographic location data in a mobile device and displaying the images and the associated geographic location data, the apparatus comprising:
   a housing having a form factor suitable for handheld use;
   a display device contained in the housing;
   an input device contained in the housing, wherein the input device includes a touch-sensitive screen;
   at least one wireless network connection component contained in the housing and configured to connect to a mobile wireless network;
   a location component contained in the housing and configured to generate geographic location data based on a current geographic location of the mobile device;
   a camera component contained in the housing configured to generate an image;
   a memory contained in the housing; and
   a processor contained in the housing and coupled among the display device, the input device, the at least one wireless network connection component, the location component, the camera component, and the memory;
   wherein the processor is configured to:
      receive an image from the camera component and geographic location data based on the current geographic location of the mobile device from the location component;
      store an association between the image and the geographic location data in the memory;
      associate supplemental information with the image, wherein the supplemental information includes at least one of geographic location data, description information, telephone number, category, street address, network address, or audio data; and cause the display device to display a plurality of images and associated supplemental information in a first user interface and to display a selected image and associated supplemental information corresponding to the selected image in a second user interface in response to receiving user input selecting an image of the plurality of images.

2. The mobile communication device of claim 1, further comprising a map display component in the housing configured to cause the display device to display a geographic indicator of the selected image on a map at the associated geographical location.

3. The mobile communication device of claim 2, wherein the processor is further configured to store associations between multiple images and multiple geographic location data and the map display component is configured to cause the display device to display multiple geographic indicators on the map based on the associated multiple geographic location data.

4. The mobile communication device of claim 1, wherein the street address is automatically determined based on the geographic location using a reverse geocoding service.

5. The mobile communication device of claim 1, wherein the processor further displays an interface to enable a user to receive a new image from the camera and to receive new values or edit values for the supplemental information.

6. The mobile communication device of claim 1, further comprising a microphone component configured to receive audio provided by a user, wherein the processor is further configured to associated audio received from the microphone with the selected image.

7. The mobile communication device of claim 1, further comprising a search component configured to cause the display device to display a list of images matching an input search term.

8. The mobile communication device of claim 1, further comprising a connection component configured to transmit the selected image and the associated supplemental information using one of an image document, an HTML document, Multimedia Messaging Service (MMS), or e-mail.

9. The mobile communication device of claim 1, wherein the processor is further configured to associate an accuracy index with the selected image, wherein the accuracy index provides an indication of the accuracy of the location component determination of the geographic location.

10. The mobile communication device of claim 1, wherein the description information is automatically assigned to the individual image based on a current location of the mobile communication device or a country name associated with the mobile communication device.

11. The mobile communication device of claim 1, wherein the first user interface comprises a navigation user interface for the user to navigate among the images in the first user interlace.

12. A method for managing images and associated geographic location data in a mobile communication device having an associated camera and displaying the images and the associated geographic location data, the method comprising:
receiving multiple images generated by the associated camera;
storing the multiple images in a storage device associated with the mobile communication device;
associating descriptive information with individual images of the multiple images, wherein associating descriptive information comprises:
generating, by a location component in the mobile communication device, geographic location data based on a geographic location of the mobile communication device;
storing an association between the geographic location data and the corresponding individual image; and
associating supplemental information with the individual image, wherein the supplemental information includes at least one of the geographic location data, street address, description information, telephone number, category, a network location, or audio data;
displaying a first user interface on a display device associated with the mobile communication device to enable a user to receive a new image from the camera and to provide new values or edit values for the supplemental information;
displaying images and descriptive information corresponding to each of the images in a second user interface on the display device;
receiving user input selecting an image from the displayed images; and
displaying the selected image and descriptive information corresponding to the selected image in a third user interface.

13. The method of claim 12, wherein the street address is automatically determined based on the geographic location using a reverse geocoding service provided by mapping software or a mapping server.

14. The method of claim 12, wherein storing the multiple images comprises: accessing a network storage component separate from the mobile communication device; and storing the multiple images, geographic location corresponding to each of the images, and supplemental information corresponding to each of the images in the network storage component.

15. The method of claim 12, wherein associating supplemental information further comprises automatically assigning the descriptive information to the individual image based on a current location of the mobile communication device or a country name associated with the mobile communication device.

16. The method of claim 12, further comprising displaying a map as part of the associated supplemental information and displaying a geographic indicator of the selected image on the map at the associated geographical location.

17. The method of claim 12, further comprising associating a new geographic location with an individual image in response to an edit command.

18. A mobile communication device for managing images and associated geographic location data and displaying the images and the associated geographic location data, the apparatus comprising:
a housing having a form factor suitable for handheld use;
an input component configured to receive input from a user;
a display component configured to display output data;
a memory configured to store data; and
a processor configured to execute one or more components comprising:
a location association component configured to receive an image and geographic location data associated with a specified geographic location and to store an association between the image and the geographic location data in the memory;
a supplemental information component configured to associate supplemental information with the image, wherein the supplemental information comprises one of description information, telephone number, category, street address, network address, or audio data, wherein the supplemental information component is configured to initiate an associated action in response to receiving a selection, inputting, or editing of the supplemental information; and an association display component configured to cause the display component to display the image, the associated geographic location data, and at least a portion of the associated supplemental information.

19. The mobile communication device of claim 18, wherein the supplemental information is automatically assigned to the individual image based on a current location of the mobile communication device or a country name associated with the mobile communication device.

20. The mobile communication device of claim 18, wherein the street address is automatically determined based on the geographic location using a reverse geocoding service provided by mapping software or a mapping server.

* * * * *